(12) United States Patent
Rangarajan et al.

(10) Patent No.: US 11,343,162 B2
(45) Date of Patent: May 24, 2022

(54) SYSTEMS AND METHODS FOR FLOW-BASED INBAND TELEMETRY

(71) Applicant: Arista Networks, Inc., Santa Clara, CA (US)

(72) Inventors: Vijay Rangarajan, Bangalore (IN); Sahil Midha, Karnataka (IN); Padmanabh Ratnakar, Karnataka (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 86 days.

(21) Appl. No.: 16/738,876

(22) Filed: Jan. 9, 2020

(65) Prior Publication Data

US 2021/0218647 A1 Jul. 15, 2021

(51) Int. Cl.
*H04L 12/26* (2006.01)
*H04L 43/026* (2022.01)
*H04L 43/062* (2022.01)
*H04L 43/08* (2022.01)

(52) U.S. Cl.
CPC .......... *H04L 43/026* (2013.01); *H04L 43/062* (2013.01); *H04L 43/08* (2013.01)

(58) Field of Classification Search
CPC ...... H04L 43/026; H04L 43/062; H04L 43/08
USPC ...................................................... 370/252
See application file for complete search history.

(56) References Cited

U.S. PATENT DOCUMENTS

| 2018/0241664 A1* | 8/2018 | Singh | H04L 63/105 |
| 2020/0267059 A1* | 8/2020 | Mozumdar | H04L 43/50 |
| 2021/0084530 A1* | 3/2021 | Song | H04L 43/04 |

FOREIGN PATENT DOCUMENTS

WO WO-2020137320 A1 * 7/2020 ........... H04L 43/106

OTHER PUBLICATIONS

File:///C:/Users/pngankam/Downloads/1909.12101.pdf (Year: 2019).*
Kumar et al., Internet -Draft (Expires: Sep. 6, 2018) Inband Flow Analyzer draft-kumar-ifa-00 (15 pages) https://tools.ietf.org/html/draft-kumar-ifa-00.
Changhoon Kim et al., In-band Network Telemetry (INT), Jun. 2016 (28 pages) https://p4.org/assets/INT-current-spec.pdf.
U.S. Appl. No. 16/738,891, filed Jan. 9, 2020, Vijay Rangarajan.

* cited by examiner

*Primary Examiner* — James E Springer
*Assistant Examiner* — Patrick F Ngankam
(74) *Attorney, Agent, or Firm* — Fountainhead Law Group P.C.

(57) ABSTRACT

Methods and systems are described for inband telemetry. The system receives a plurality of packets, each packet comprising a portion with INT data. The system identifies a packet flow from a source device to a destination device in the plurality of packets and calculates a telemetry metric based on INT data of a plurality of packets of the packet flow. Then the system forwards the calculated telemetry metric to an INT collector.

23 Claims, 6 Drawing Sheets

| Flow ID | Source Address | Destination Address | Source Port | Destination Port | Protocol | Per Hop Latency | Congestion? | Path | No. of Packets | Telemetry Metric 1 | ... | Telemetry Metric T |
|---|---|---|---|---|---|---|---|---|---|---|---|---|
| 1 | 216.3.128.12 | 127.0.0.1 | 80 | 80 | TCP/IP | Hop 1 = 10ms<br>Hop 2 = 2ms | Hop 1 - Yes<br>Hop 2 - No | {A1,A2} | 1,324,240 | | | |
| 2 | 211.3.128.30 | 127.0.0.2 | 20 | 21 | FTP | Hop 1 = 5ms<br>Hop 2 = 1ms | Hop 1 - Yes<br>Hop 2 - No | {A3,A5} | 542,352 | | | |
| 3 | 127.0.0.1 | 210.1.2.2 | 554 | 554 | RTSP | Hop 1 = 7ms<br>Hop 2 = 3ms | Hop 1 - Yes<br>Hop 2 - No | {A6,A5} | 100,200 | | | |

FIG. 3

"SYSTEMS AND METHODS FOR FLOW-BASED INBAND TELEMETRY"

CROSS-REFERENCE TO RELATED APPLICATION

This application is related to a co-pending U.S. patent application Ser. No. 16/738,891, entitled "INTERVAL FLOW-BASED INBAND TELEMETRY" (filed on Jan. 9, 2020) which is incorporated by reference herein in its entirety.

BACKGROUND

The present disclosure relates to inband telemetry techniques. In particular, the present disclosure relates to a network device that obtains inband telemetry data from packets and periodically reports aggregated flow-based telemetry metrics.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an exemplary flow table, in accordance with some embodiments of the disclosure;

DETAILED DESCRIPTION

In networks having an inband telemetry (INT) infrastructure, INT-enabled devices add telemetry data to all packets they handle or to a sample set of packets they handle. In this way, telemetry data is acquired in the data plane without the need to invoke the control plane. An INT node typically reports telemetry data accumulated in the INT portion of a packet to a collector before the packet leaves the INT-enabled network or subnet. In this approach, the collector frequently becomes overwhelmed due to the need to receive and process data from each packet received from multiple INT nodes.

To address this problem, disclosed herein is an inband telemetry system having a network device (e.g., an INT node) that reports aggregated flow-specific telemetry metrics, instead of reporting telemetry data from each packet. In this way, the collector will receive telemetry metrics that have already been aggregated at much larger time intervals, easing the burden on the processing capability of the collector and preventing the collector from becoming overwhelmed.

To this end, the network device can identify flows among all received packets with INT headers. Each flow may be identified based on a path identification contained in the packets. For example, packets from the same origin and destined for the same destination may be considered a part of the same flow. The flow-specific metrics may be stored in a flow table where the metrics are stored for each identified flow. When a flow is identified, the network device may compute telemetry metrics of the flow by using data from multiple packets of that flow. For example, latency data from packets of the flow may be averaged over a reporting time period. The computed flow-specific telemetry metrics are then forwarded to the collector. For example, latency data of a flow may be averaged over a reporting period and reported at the end of that reporting period. In one implementation, the INT node may make a report by transmitting the content of the flow table to the collector. This process may be periodically repeated for each new reporting period.

Figure 1:
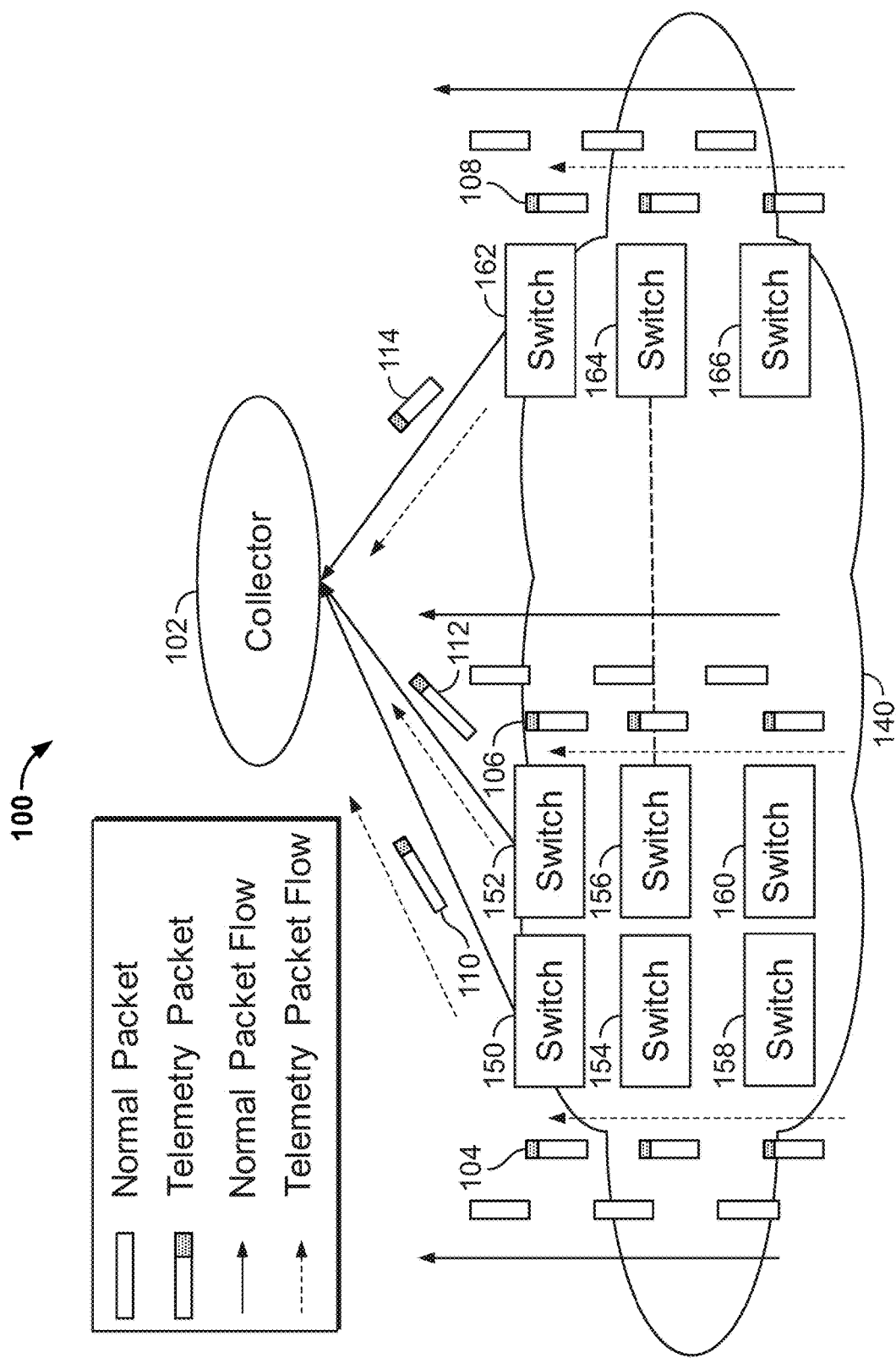
FIG. 1 shows an exemplary system for collecting inband telemetry data, in accordance with some embodiments of the disclosure.

FIG. 1 shows an exemplary system 100 for collecting inband telemetry (INT) data of network 140, in accordance with some embodiments of the disclosure. System 100 may use multiple devices to collect telemetry metrics (e.g., latency, packet path, queue length and congestion, etc.) for packets that traverse network 140 without invoking control plane functionality. To accomplish this, system 100 may use INT aware devices that receive a packet and add telemetry to the packet before that packet is forwarded. INT data stored in a packet may be forwarded to collector 102, which may be configured to receive telemetry data from multiple devices in network 140. In some embodiments, the collector may use the telemetry data to analyze network performance as a whole, and to perform network management functions based on the analysis. For example, collector 102 may change routing policy, activate more switches, generate network performance reports, and/or perform any other network management function.

System 100 may include multiple INT-aware switches 150-166. While system 100 shows switches, other packet-forwarding devices, such as hubs, routers or bridges, may also be used instead of, or in addition to, switches. INT-aware switches 150-166 may be configured to recognize packets (e.g., packets 104, 106, 108) that include INT data (e.g., an INT header). When such a packet is received by one of switches 150-166, that switch may add telemetry data to the packet before that packet is forwarded to a next switch. For example, one of switches 150-166 may add its own address to the packet. In another example, the switch may also add timestamps indicating when the packet was received by the switch and when it was forwarded to a next switch. One of switches 150-166 may also add information regarding its queue size, and whether congestion was experienced when processing the received packet.

In some embodiments, one of switches 150-166 may compute one or more telemetry metrics based on the data stored in a packet that it receives. In some embodiments, metrics are computed for every packet. Alternatively, metrics may be computed based on a certain percentage (e.g., 5%) of sampled packets. For example, switch 150 may receive packet 104, which was previously forwarded by switches 158 and 154, where both switches 158 and 154 added INT data to packet 104. Switch 150 then computes telemetry metrics based on data in the INT portion of packet 150. For example, switch 150 may compute latency of the last hop experienced by that packet (e.g., hop from switch 154 to switch 150) by comparing a timestamp indicating when packet 104 was sent by switch 154, and timestamp indicating when packet 150 was received by switch 150.

Switch 150 may also compute other metrics (e.g., per hop metrics), such as whether congestion was experienced during last hop and/or what the size of the queue was during the hop. In some embodiments, switch 150 may also compute other metrics, for example, switch 150 may determine what path packet 104 took (e.g., the path may include {switch 158, switch 154}).

In some embodiments, switch 150 may send INT data from packet 104 and send it to collector 102. In some embodiments, switch 150 may calculate and send metrics calculated based on INT data from packet 104 to collector 102. For example, such data may be sent every time a packet is processed. In some embodiments, collector 102 is configured to receive such INT data from all switches 150-166. For this reason, it's possible collector 102 may become overwhelmed when too much data comes in at the same time. To overcome this problem, modified system 200 is described in FIG. 2.

Figure 2:
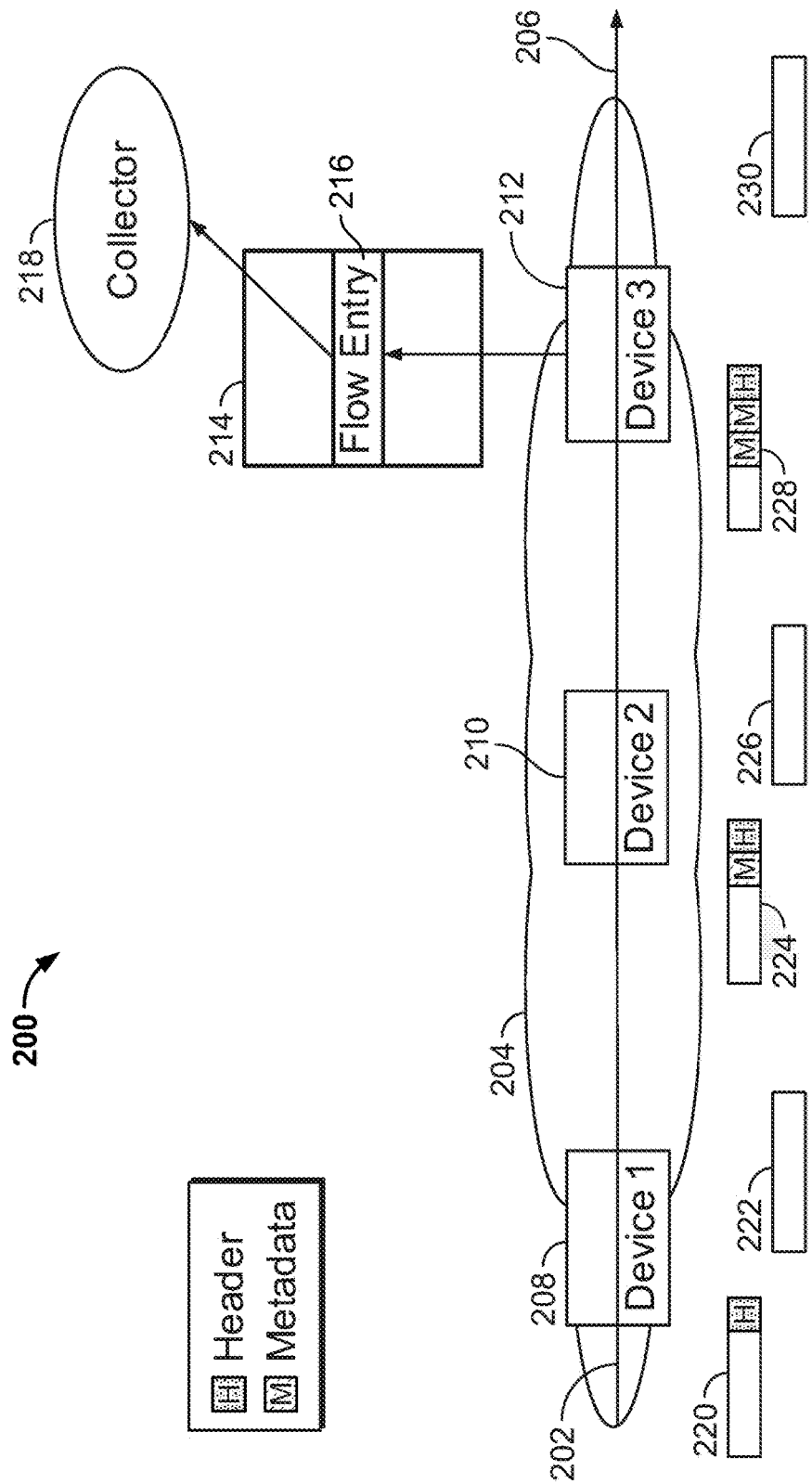
FIG. 2 shows another exemplary system for collecting inband telemetry data, in accordance with some embodiments of the disclosure.

FIG. 2 shows an exemplary system 200 for collecting inband telemetry (INT) data of network 204, in accordance with some embodiments of the disclosure. In some embodiments, system 200 includes the same devices as shown in system 100. For example, network 204 may be the same as network 140, device 212 may be the same as switch 150, device 210 may be the same switch 154, device 208 may be the same as switch 158, and collector 218 may be the same as collector 102. In some embodiments, each of device 208, 210, and 212 may be an INT-enabled packet forwarding device (e.g., a router, a switch, or any other INT-enabled network device).

As described above, INT-enabled devices 208-212 may examine incoming packets to identify packets that include an INT header. FIG. 2 shows the progress of a packet as it travels along network 204. For example, a packet 220 may enter network 204 with payload 222. As the packet 220, or copies of packet 220 (packets 224 and 228) are forwarded by devices 208, 210, and 212, payload 222 may remain the same as it is forwarded along the network. For example, payload 222 of packet 220, payload 226 of packet 224, and payload 230 of packet 228 may remain the same, while other parts (e.g., headers and INT data) of packets 220, 224, and 228 may change.

In some embodiments, packet 220 may arrive from a device 202 that is not a part of the INT-enabled network 204 (e.g., packet 220 may arrive from a user device or from a switch with no INT capabilities.) Device 208 may then add a header (H) to packet 220 or to a copy of packet 220, while payload 222 remains the same. Additionally, in some embodiments, device 208 adds INT telemetry data (M) to packet 220. In some embodiments, the telemetry data may be the same as described above in relation to FIG. 1 (timestamp data, congestion data, address data, queue-size data, etc.).

Subsequently, device 210 receives packet 224 which includes the header and telemetry data added by device 208. Payload 226 remains the same. Upon detecting the presence of the INT header, device 210 may add additional INT telemetry data to packet 224. Similarly, device 212 receives packet 228 which includes the header and telemetry data added by devices 208 and 210. Payload 230 remains the same. Upon detecting the presence of the INT header, device 212 handles the packet as will be described below.

As shown in FIG. 2, some or all network devices 208-212 may include a flow table for tracking network metrics that are aggregated for a detected flow. For example, flow tables may be kept by devices that forward packets outside of INT-enabled network 204. In some embodiments, all devices of network 204 may maintain flow tables. For example, device 212 may include flow table 214. An exemplary flow table is shown below in FIG. 3. In some embodiments, device 212 maintains a table that lists all packet flows that it has recently handled. For example, two packets may be determined to belong to the same flow if they share the following data: source address, destination address, source port, destination port, and protocol. In some embodiments, other methods to detect flow may be used (e.g., shared port and destination address only). In some embodiments, other ways to detect flows may be used (e.g., based on source address and destination only).

For example, whenever a packet is received by device 212, the device may check if that packet belongs to a flow that is already present in flow table 214. If not, device 212 may create a new entry 216 in flow table 214. Device 212 then populates entry 216 with information that is based on INT data from packet 228. For example, entry 216 may include latency data, congestion data, path data, queue data, any other network telemetry data or any combination of the above.

If the packet belongs to an already-existing flow entry, device 212 updates the relevant flow table entry based on INT data from packet 228. For example, device 212 may store calculated aggregated statistical values based on INT data from packet 228 and data from previously received packets from the same packet flow. Device 212 may calculate and store a variety of statistical values, e.g., minimum, maximum, average, variance, jitter, standard deviation, mode, or any combination thereof. For example, for a latency metric, device 212 may calculate and store in the flow table aggregated data for a per-hop latency of packets of the flow to which packet 228 belongs. In some embodiments, device 212 calculates and stores in the one or more of: minimum latency, maximum latency, average latency, variance of latency, jitter of latency, standard deviation of latency, mode of latency, or any combination thereof in a flow table entry. Device 212 may then forward payload 230 outside of network 204, e.g., to endpoint device 206 or to a switch that is not INT-enabled (e.g., device 212 may strip the INT header and INT metadata from packet 228 before forwarding). In some embodiments, device 212 may, in addition to storing an aggregated metric for the flow, also store metrics derived solely from the last received packet of the flow.

At certain time intervals (e.g., periodically or a-periodically) device 212 may forward aggregated data stored in flow table 214 to collector 218. For example, device 212 may forward that data every minute or every 30 seconds. In some embodiments, device 212 may forward the data on demand. Compared to system 100, system 200 reduces the amount of transmissions received by collector 218 from devices 208-212 because aggregated INT data is sent instead of data from every packet. Collector 218 may then take network actions based on all received data (e.g., generated warnings, changes in packet-forwarding policies, etc.). In some embodiments, device 212 may in addition to the aggregated metric also forward metrics calculated based on the last received packet of the flow.

In some embodiments, collector 218 may be specially adapted to receive and handle flow-based metrics data. For example, collector 218 may include algorithms for evaluating the overall state of network 204 based on per-flow INT metrics received from devices 208, 210, and 212. In some embodiments, collector 218 may receive per-flow INT metrics from a single device. For example, collector 218 may receive per-flow INT metrics only from device 212 that is the last device in INT-enabled network 204, before the packets are forwarded to external network 206. In such embodiments, collector 218 may directly use the received data to evaluate network conditions. In some embodiments, collector 218 may receive per-flow INT metrics from multiple devices 208, 210, and 212, where each device tracked metrics for the same packet flow. In such embodiments, collector 218 may for example, combine the received for the same flow (e.g., by averaging). In another, implementation collector 218 may rely on per-flow INT metrics received from one of the devices 208, 210, and 212 (e.g., the last INT-enabled device in the path of the flow).

FIG. 3 shows an exemplary flow table 300, in accordance with some embodiments of the disclosure. For example, flow table 300 may be flow table 214 stored in memory of an INT-enabled network device (e.g., device 212). Table 300 is shown with three packet flows (1, 2, and 3), however, any number of flows may be stored.

For example, each row of the flow table 300 represents a flow tracked by device 212. Column 304 may contain flow IDs of each flow. Columns 306-314 may identify each flow by source address, destination address, source port, destination port, and protocol. In some embodiments, the device may treat any packet that includes the same source address, destination address, source port, destination port, and protocol as belonging to the same flow. For example, if a device were to receive a packet with metadata indicating source address to be 216.3.128.12, the destination address to be 127.0.0.1, the source port to be 80, the destination port to be 80 and the protocol to be TCP/IP, the device determines that a packet is part of flow "1." If a packet is received that is not part of an existing flow, and new flow entry may be created, e.g., as row 4.

Flow table 300 may also include aggregated INT statistics for each flow. For example, column 316 may track average per-hop latency of the flow for each hop. For example, column 316 may track per-hop statistics for hop 1 (e.g., a hop from device 208 to device 210) and hop 2 (e.g., a hop from device 210 to device 212). In some embodiments, flow table 300 may also track total latency aggregates along all hops. When the device receives a packet of flow 1 column 316/row 1 entry may be updated to include data from the newly received packet. For example, latency of the most recent hop (e.g., hop 2) may be updated. For example, if flow "1" has average per-hop latency of 15 ms (over 2 packets) for hop 2, and then the device receives a packet belonging to flow "1" and indicating hop 2 latency of 30 ms, the column 316/row 1 entry may be updated with a new average to be 20 ms (over 3 packets) for hop 2.

Column 318 may be used to track a binary per-hop congestion flag that indicates whether any packets of the respective flow have experienced congestion at each hop. For example, column 318 may track per-hop congestion for hop 1 (e.g., a hop from device 208 to device 210) and hop 2 (e.g., a hop from device 210 to device 212). In the shown example, if column 318/row 2 has value of "no" for hop 2, and then the device receives a packet belonging to flow "2" and indicating congestion on the second hop, "hop 2" value of column 318/row 2 may be updated to have a value of "yes."

Column 320 may track the path metric (e.g., it may list of all nodes traversed by packets of a flow). Column 321 may track the number of packets of the respective flow. In addition, other columns 322-324 may track a variety of other INT metrics (e.g., per-hop aggregated metrics, and per flow aggregated metrics). For example, columns 322-324 may track aggregated metrics for minimum latency, maximum latency, average latency, variance of latency, jitter of latency, standard deviation of latency, mode of latency, or any combination thereof. Same or similar statistical, metrics may be calculated and stored for other parameters of packets of the flow. In some embodiments, flow table 300 may also include columns for storing metrics calculated based on the a single last-received packet of the flow. The content of flow table 300 may be periodically reported to a collector (e.g., collector 218).

Figure 4:
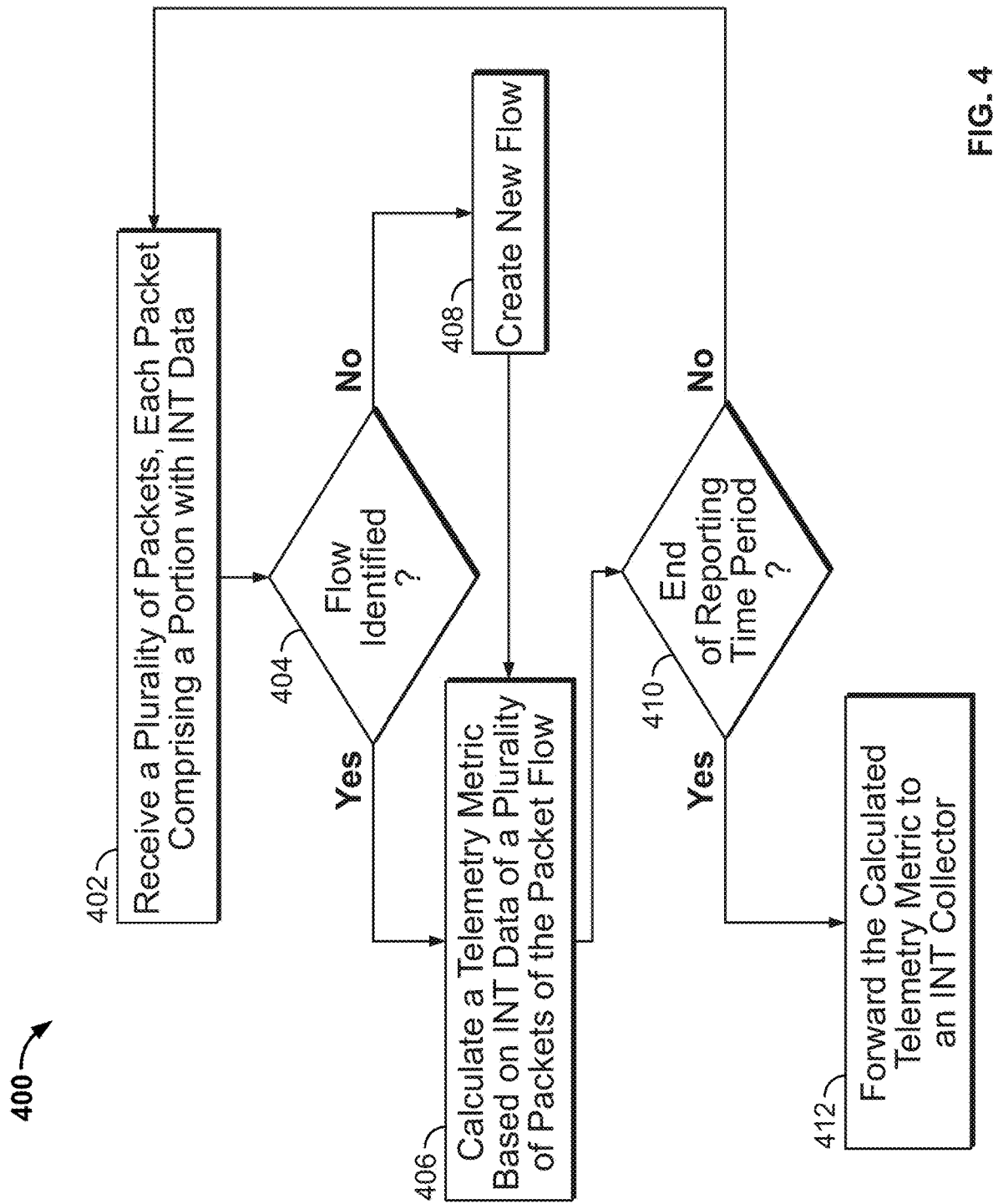
FIG. 4 is a flowchart of an illustrative process for collecting inband telemetry data, in accordance with some embodiments of the disclosure.

FIG. 4 is a flowchart of an illustrative process for collecting inband telemetry data, in accordance with some embodiments of the disclosure. For example, process 400 may be performed by a control circuitry of a device (e.g., a packet forwarding device or a network device). For example, the control circuitry may be control circuitry 604 of network device 602 of FIG. 6 as described below.

A process 400 for processing telemetry data begins at block 402, where control circuitry receives a plurality of packets. For example, packets may be received as part of normal packet forwarding operations. All or some of the packets may include INT data (e.g., data relating to network telemetry stored as part of the packet).

At 404, control circuitry identifies a portion of the packets that belong to a flow of packets (e.g., by identifying packets with same protocol, same sources and destination addressee, and same sources and destination port). If the flow is identified, control circuitry proceeds to step 406. If no existing flow is identified, control circuitry determines that the packets belong to a new flow and begins tracking statistics for the new flow (e.g., by creating a new row in a flow table, such as flow table 300).

At 406, control circuitry calculates a telemetry metric based on INT data in the plurality of packets of the same flow. For example, control circuitry may maintain a flow table (e.g., as described with respect to FIG. 3) in memory (e.g., storage 606 of FIG. 6). Every time a packet of the flow is received or sampled, control circuitry may update the aggregated metrics in the flow table based on new data from INT portion of that packet. Stored metrics can be stored as part of the flow table.

At 410, control circuitry checks if an end of a reporting time period has been reached (e.g., this may occur every 30 seconds). If not, control circuitry may continue to receive more packets at 402. If the end of a reporting time period was reached, control circuitry sends the metrics in the flow table to a collector (e.g., collector 218) as step 412.

Figure 5:
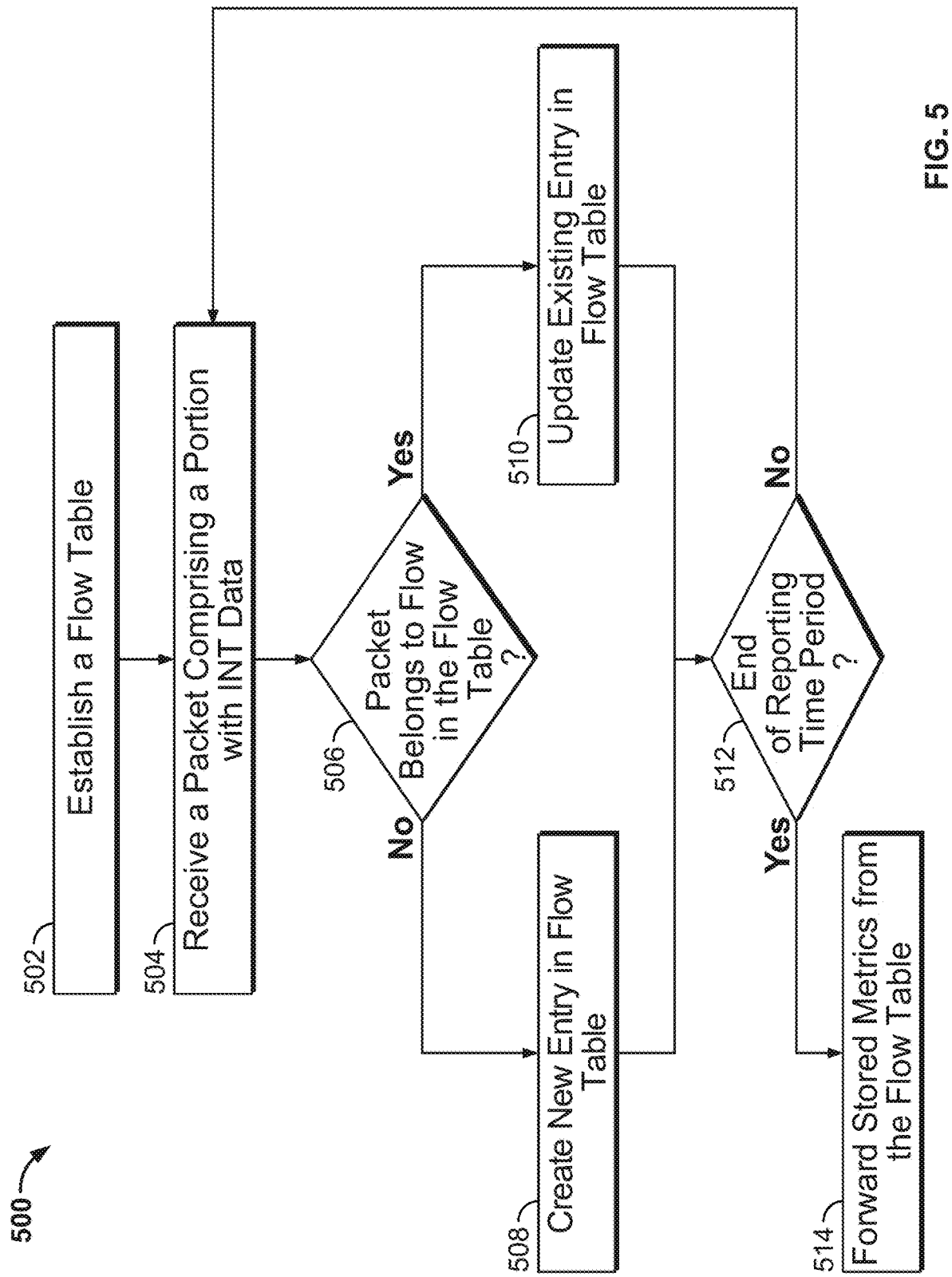
FIG. 5 is another flowchart of an illustrative process for collecting inband telemetry data, in accordance with some embodiments of the disclosure.

FIG. 5 is a flowchart of another illustrative process for collecting inband telemetry data, in accordance with some embodiments of the disclosure. For example, process 500 may be performed by a control circuitry of a device (e.g., a packet forwarding device or a network device). For example, the control circuitry may be control circuitry 604 of network device 602 of FIG. 6 as described below.

At 502, control circuitry may establish a flow table (e.g., as shown in FIG. 3) data structure (e.g., in storage 606). Once established, the flow table may store aggregated metrics (e.g., per-hop or per-flow metrics) for all packet flow identified by control circuitry.

At 504, control circuitry receives a packet (e.g., via network interface 612). In some embodiments, a packet includes an INT data portion. For example, the packet may be received from outside of the INT-enabled network or from another INT-enabled switch.

At 506, control circuitry checks whether the packet belongs to any flow entries already present in the flow table. For example, control circuitry may compare source and destination of the packet to source and destination of the tracked flows. If the packet matches one of the flows, process 500 proceeds to 510; if there is no match, process 500 proceeds to 508.

At 508, a new entry (e.g., new row in table 300) is established by the control circuitry. That row may be populated with metrics computed based on the single initial packet. At 510, control circuitry updates the aggregated metrics (e.g., average metrics) in the existing flow table entry using new data from the new packet received at 504. For example, the average may be updated by calculating a weighted average of the stored metric and a metric calculated based on the data from the newly received packet. In some embodiments, the average may be weighted based on how many packets were previously received.

At 512, the control circuitry checks if an end of a reporting time period has been reached (e.g., this may occur every 30 seconds). If not, control circuitry may continue to receive more packets at 504. If the end of a reporting time period is reached, control circuitry sends the metrics in the flow table to a collector (e.g., collector 218) at step 514.

In some embodiments, after the control circuitry sends the metrics in the flow table to a collector, the statistics flow table may be reset or purged. For example, the flow table may be emptied, and then used to begin calculating new statistics for each flow for the next reporting time period. In some embodiments, such a reset may be performed at the end of every reporting period. In some embodiments, instead of purging the data, the metrics may continue to be calculated across multiple reporting periods. For example, at the end of the second reporting period, the control circuitry may report metrics that were calculated over the first and the second reporting periods. In some embodiments, the control circuitry may both: calculate and report separate metrics for each single reporting time period; and calculate and report metrics computed over all reporting periods.

Figure 6:
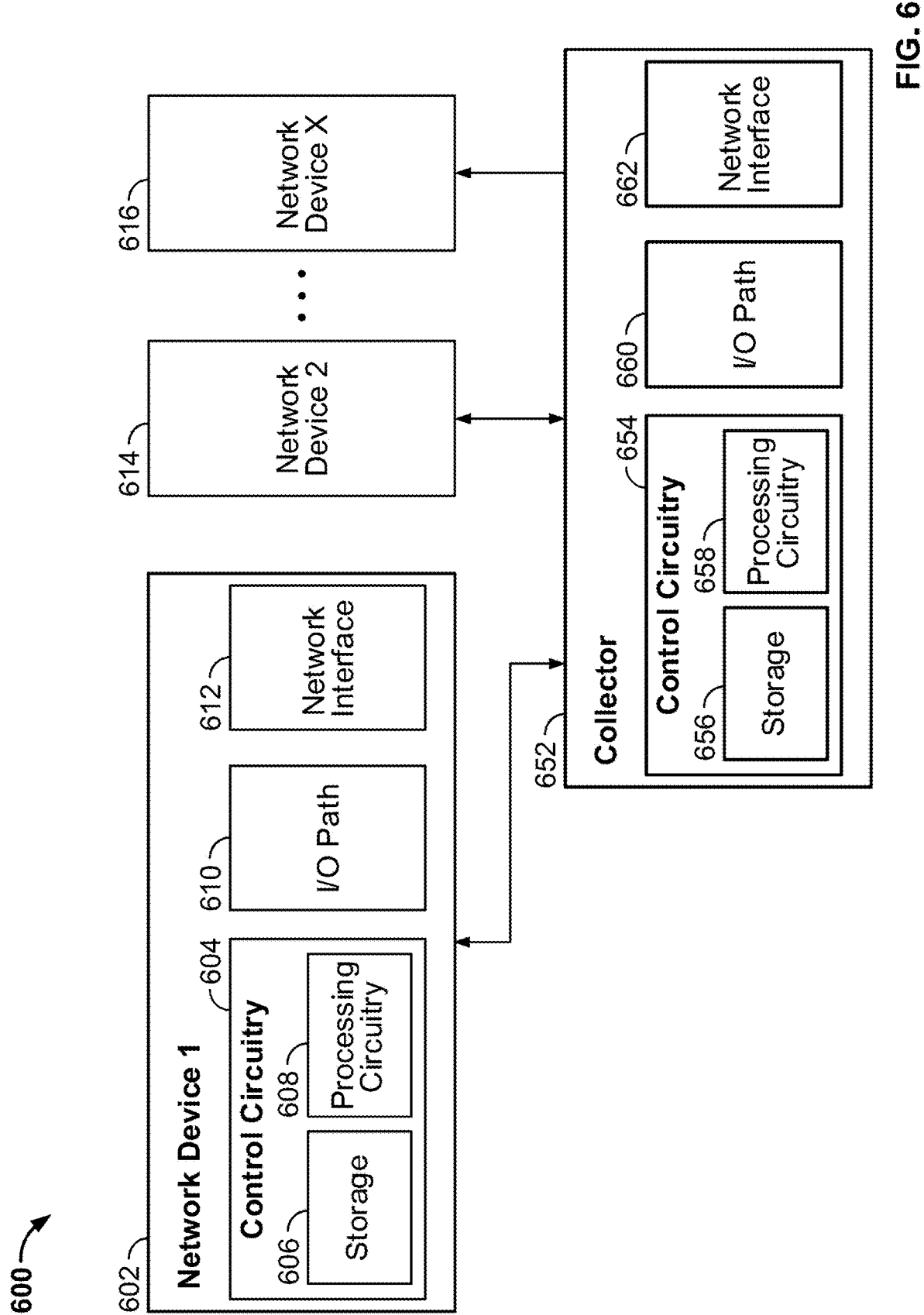
FIG. 6 shows a diagram of illustrative devices for collecting inband telemetry data, in accordance with some embodiments of the disclosure.

FIG. 6 shows a diagram of illustrative devices of a system 600 that includes network device 602, network devices 614-616, and collector 652. For example, device 602 may be the same as device 212, network device 614-616 may be the same as devices 208-210, and collector 652 may be the same as collector 218.

Device 602 may receive and send data via an input/output (I/O) path 610. I/O path 610 is communicatively connected to control circuitry 604, which includes processing circuitry 608 and storage (or memory) 606. Control circuitry 604 may send and receive commands, requests, and other suitable data using I/O path 610. I/O path 610 may connect control circuitry 604 (and specifically processing circuitry 608) to one or more network interfaces 612, which in turn connect device 602 to other devices on the network (e.g., network 204 or 140).

Control circuitry 604 may be based on any suitable processing circuitry, such as processing circuitry 608. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 604 executes instructions stored in memory (i.e., storage 606). For example, the instructions may cause control circuitry 604 to perform packet forwarding and INT operations described above and below.

Memory 606 may be an electronic storage device that is part of control circuitry 604. As referred to herein, the phrase "electronic storage device" or "storage device" should be understood to mean any device for storing electronic data, computer software, instructions, and/or firmware, such as random-access memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors.

Control circuitry 604 may use network interface 612 to receive and forward packets to other network devices 614-616 (which may include hardware similar to that of device 602), e.g., over any kind of a wired or wireless network. In some embodiments, devices 602, 614, and 616 may be INT-enabled device. For example, memory 606 may include instructions for handling INT packets to collect and forward telemetry data as described above. In some embodiments, network device 602 may store a flow table in memory 606, where the flow table is established and updated as described above. Control circuitry may periodically forward data from the flow table to collector 652.

Collector 652 may include I/O path 660, network interface 662, and control circuitry 654 that includes processing circuitry 658 and storage 656. These elements may function similarly to elements 604-612 as described above. Collector 652 may be configured to receive and process telemetry data from all devices 602, 614, and 616 via network interface 662. In some embodiments, collector 652 may process all received INT data and use that data to make network-wide actions and generate reports.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for inband telemetry (INT), the method comprising:
   receiving, by an INT-enabled network device, a first packet;

in response to determining that the first packet does not
match any flow entry in a flow table:
generating a new flow entry in the flow table; and
updating the new flow entry to include a telemetry
metric that is based on INT data of the first packet;
receiving, by the INT-enabled network device, a second
packet;
in response to determining that the second packet belongs
to the same flow as the first packet, updating the
telemetry metric of the new flow entry based on INT
data of the second packet; and
forwarding data from the new flow entry to an INT
collector.

2. The method of claim 1, wherein determining that the second packet belongs to the same flow as the first packet comprises determining that the first packet and the second packet share source address and destination address.

3. The method of claim 1, wherein the telemetry metric is one of minimum latency, maximum latency, average latency, congestion metric, and path metric.

4. The method of claim 1, wherein updating the telemetry metric based on the INT data of the second packet comprises calculating a weighted average of the telemetry metric stored in the new flow entry and a current telemetry metric calculated based on the INT data of the second packet.

5. The method of claim 1, wherein at least one of forwarding data from the new flow entry to an INT collector and purging the telemetry metric of the new flow entry is performed at an end of a predetermined reporting period.

6. The method of claim 1, further comprising:
receiving, by an INT-enabled network device, a third packet; and
in response to determining that the third packet belongs to the same flow as the first packet, updating the new flow entry to include a telemetry metric that is based on INT data of the third packet.

7. The method of claim 1, further comprising:
receiving, by the INT collector, data from the new flow entry;
receiving, by the INT collector, additional data from another INT-enabled network device, wherein the additional that corresponds to the same flow as the first packet;
evaluating by the INT collector, state of a network based data from the new flow entry and based on the additional data.

8. An inband telemetry (INT) device comprising:
a memory configured to store a flow table
a network interface configured to receive a first packet comprising a portion with INT data and a second packet comprising a portion with INT data; and
control circuitry configured to:
in response to determining that the first packet does not match any flow entry in the flow table:
generate a new flow entry in the flow table; and
update the new flow entry to include a telemetry metric that is based on INT data of the first packet;
in response to determining that the second packet belongs to the same flow as the first packet, update the telemetry metric of the new flow entry based on INT data of the second packet; and
wherein the network interface is configured to forward data from the new flow entry to an INT collector.

9. The INT device of claim 8, wherein the telemetry metric is one of minimum latency, maximum latency, average latency, congestion metric, and path metric.

10. The INT device of claim 8, wherein the control circuitry is configured to update the telemetry metric based on the INT data of the second packet by calculating a weighted average of the telemetry metric stored in the new flow entry and a current telemetry metric calculated based on the INT data of the second packet.

11. The INT device of claim 8, wherein the network interface is configured to perform at least one of forwarding data from the new flow entry to an INT collector and purging the telemetry metric of the new flow entry at an end of a predetermined reporting period.

12. The INT device of claim 8, further comprising:
receiving, by an INT-enabled network device, a third packet; and
in response to determining that the third packet belongs to the same flow as the first packet, updating the new flow entry to include a telemetry metric that is based on INT data of the third packet.

13. A method for inband telemetry (INT), the method comprising:
receiving, by an INT-enabled network device, a plurality of packets, each packet comprising a portion with INT data;
identifying a packet flow from a source device to a destination device in the plurality of packets;
in response to determining that the identified packet flow does not match a flow entry in a flow table:
generating a new flow entry in the flow table;
calculating a telemetry metric based on INT data of a plurality of packets of the packet flow; and
updating the new flow entry to include the calculated telemetry metric; and
forwarding the calculated telemetry metric to an INT collector.

14. The method of claim 13, wherein the telemetry metric is at least one of a minimum latency, a maximum latency, an average latency, a congestion metric, a path metric, a per-hop latency, and a presence of a congestion flag indicating a packet encountering congestion during at least one hop.

15. The method of claim 13, wherein identifying the packet flow comprises identifying packets that share source address, destination address, protocol address, source port, destination port, and protocol.

16. The method of claim 13, wherein calculating the telemetry metric comprises maintaining a flow table for the packet flow and calculating the telemetry metric based on the flow table.

17. The method of claim 13, wherein calculating the telemetry metric comprises aggregating telemetry metrics of the plurality of packets received during an export time period.

18. The method of claim 13, wherein forwarding the calculated telemetry metric to the INT collector comprises forwarding the calculated average telemetry metric at the end of the export time period.

19. The method of claim 13, wherein the telemetry metric is a path metric that comprises a set of all INT nodes traversed by packets of the packet flow.

20. The method of claim 13, wherein the telemetry metric comprises a telemetry metric of the last packet of the flow.

21. An inband telemetry (INT) device comprising:
a network interface configured to receive a plurality of packets, each packet comprising a portion with INT data; and
control circuitry configured to:
identify a packet flow from a source device to a destination device in the plurality of packets; and in response to determining that the identified packet flow does not match a flow entry in a flow table:
generating a new flow entry in the flow table;
calculating a telemetry metric based on INT data of a plurality of packets of the packet flow; and
updating the new flow entry to include the calculated telemetry metric,
wherein the network interface is further configured to forward the calculated telemetry metric to an INT collector.

22. The method of claim 1, wherein the telemetry metric is a statistical value.

23. The method of claim 1, wherein the INT-enabled network device is a last device in an INT-enabled network before the first and second packets are forwarded to an external network.

* * * * *